US010303627B2

(12) United States Patent
Bubb et al.

(10) Patent No.: US 10,303,627 B2
(45) Date of Patent: May 28, 2019

(54) HARDWARE QUEUE MANAGER WITH WATER MARKING

(71) Applicant: International Business Machines Corporation, Armonk, NY (US)

(72) Inventors: Clinton E. Bubb, Milton, NY (US); Michael Grassi, Shokan, NY (US); Howard M. Haynie, Wappingers Falls, NY (US); Raymond M. Higgs, Poughkeepsie, NY (US); Kirk Pospesel, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/801,337

(22) Filed: Nov. 2, 2017

(65) Prior Publication Data

US 2018/0349300 A1    Dec. 6, 2018

Related U.S. Application Data

(63) Continuation of application No. 15/609,947, filed on May 31, 2017.

(51) Int. Cl.
*G06F 3/06* (2006.01)
*G06F 13/16* (2006.01)

(52) U.S. Cl.
CPC ........ *G06F 13/1642* (2013.01); *G06F 3/0604* (2013.01); *G06F 3/0653* (2013.01); *G06F 3/0673* (2013.01)

(58) Field of Classification Search
CPC .................................................. G06F 13/1642
See application file for complete search history.

(56) References Cited

U.S. PATENT DOCUMENTS

| | | | | |
|---|---|---|---|---|
| 5,974,518 A | * | 10/1999 | Nogradi | H04L 49/90 709/236 |
| 6,643,719 B1 | * | 11/2003 | Baker | G06F 5/06 710/33 |

(Continued)

OTHER PUBLICATIONS

Appendix P, List of IBM Patents or Patent Applications Treated as Related dated Nov. 2, 2017.

(Continued)

*Primary Examiner* — Elias Mamo
(74) *Attorney, Agent, or Firm* — Cantor Colburn LLP; Steven Chiu

(57) ABSTRACT

A system for managing one or more queues in a multi-processor environment includes a memory configured to be accessed by a plurality of processing elements, and a queue manager disposed in communication with a plurality of processors and with the memory, the queue manager configured to control a queue in the memory, the queue including a plurality of queue elements, the queue manager configured to intercept a message from a processing element of the plurality of processing elements and perform one or more queuing operations on the queue based on the message. The system also includes a dynamically configurable queue full value maintained by the queue manager, the queue full value being a threshold value that specifies a maximum number of the queue elements that can be written to before a queue full condition is detected, the maximum number based on a number of processing elements.

6 Claims, 4 Drawing Sheets

(56) References Cited

U.S. PATENT DOCUMENTS

| | | | | |
|---|---|---|---|---|
| 7,359,324 | B1* | 4/2008 | Ouellette | H04L 43/087 370/230 |
| 8,706,977 | B2* | 4/2014 | Lee | G06F 9/544 711/153 |
| 2003/0067877 | A1* | 4/2003 | Sivakumar | H04L 47/2416 370/232 |
| 2004/0242204 | A1* | 12/2004 | Ido | H04L 47/10 455/412.1 |
| 2004/0260828 | A1* | 12/2004 | Price | H04L 29/06027 709/231 |
| 2005/0050557 | A1* | 3/2005 | Gabryjelski | G11B 27/034 720/600 |

OTHER PUBLICATIONS

Bubb et al., "Hardware Queue Manager With Water Marking" U.S. Appl. No. 15/609,947, filed May 31, 2017.

* cited by examiner

HARDWARE QUEUE MANAGER WITH WATER MARKING

DOMESTIC PRIORITY

This application is a continuation of the legally related U.S. application Ser. No. 15/609,947 filed May 31, 2017, which is fully incorporated herein by reference.

BACKGROUND

The present invention relates generally to multi-processor technology, and more specifically, to queue management in a multi-processor environment.

Multi-processor or parallel-processor designs are increasingly utilized for their ability to improve computing speeds, performance, and reliability relative to single processor designs. A multi-processor system includes multiple independent processors, which can execute multiple instructions in parallel, substantially increasing processing speed.

Although multi-processor systems typically enhance the performance of a computer system, the multiple processors also create technical problems, such as managing multiple processors accessing a shared memory at the same time. Orchestration of activity between multiple processors is frequently achieved using queues stored in a common memory space. Processors generally must inspect the queues and/or communicate with other processors to avoid conflicts due to multiple processors accessing a queue.

SUMMARY

Embodiments include a method, system, and computer program product for monitoring participants in a group. In accordance with one or more embodiments, a system for managing one or more queues in a multi-processor environment includes a memory configured to be accessed by a plurality of processing elements in the multi-processor environment, and a queue manager disposed in communication with a plurality of processors and with the memory, the queue manager configured to control a queue in the memory, the queue including a plurality of queue elements, the queue manager configured to intercept a message from a processing element of the plurality of processing elements and perform one or more queuing operations on the queue based on the message. The system also includes a dynamically configurable queue full value maintained by the queue manager, the queue full value being a threshold value that specifies a maximum number of the queue elements that can be written to before a queue full condition is detected, the maximum number based on a number of processing elements of the plurality of processing elements.

In accordance with one or more other embodiments, a computer implemented method of managing one or more queues in a multi-processor environment includes monitoring, by a queue manager, a queue in a memory configured to be accessed by a plurality of processing elements in the multi-processor environment, the queue manager disposed in communication with a plurality of processors and with the memory, the queue manager configured to control a queue in the memory, the queue including a plurality of queue elements, the queue manager configured to intercept a message from a processing element of the plurality of processing elements and perform one or more queuing operations on the queue based on the message. The method also includes inspecting a dynamically configurable queue full value maintained by the queue manager, the queue full value being a threshold value that specifies a maximum number of the queue elements that can be written to before a queue full condition is detected, the maximum number based on a number of processing elements of the plurality of processing elements, comparing a number of full queue elements in the queue to the threshold value, and detecting the queue full condition based on the number of full queue elements equal to or exceeding the threshold value, and based on detecting the queue full condition, performing one or more of preventing one or more enqueues from the plurality of processing elements and broadcasting the queue full condition to the plurality of processing elements.

In accordance with one or more further embodiments, a computer program product for managing one or more queues in a multi-processor environment includes a computer readable storage medium having program instructions embodied therewith. The program instructions are executable by a processor to cause the processor to perform monitoring, by a queue manager, a queue in a memory configured to be accessed by a plurality of processing elements in the multi-processor environment, the queue manager disposed in communication with a plurality of processors and with the memory, the queue manager configured to control a queue in the memory, the queue including a plurality of queue elements, the queue manager configured to intercept a message from a processing element of the plurality of processing elements and perform one or more queuing operations on the queue based on the message. The instructions are also executable by the processor to cause the processor to perform inspecting a dynamically configurable queue full value maintained by the queue manager, the queue full value being a threshold value that specifies a maximum number of the queue elements that can be written to before a queue full condition is detected, the maximum number based on a number of processing elements of the plurality of processing elements, comparing a number of full queue elements in the queue to the threshold value, and detecting the queue full condition based on the number of full queue elements equal to or exceeding the threshold value, and based on detecting the queue full condition, performing one or more of preventing one or more enqueues from the plurality of processing elements and broadcasting the queue full condition to the plurality of processing elements.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter of the present disclosure is particularly pointed out and distinctly claimed in the claims at the conclusion of the specification. The foregoing and other features and advantages of the one or more embodiments disclosed herein are apparent from the following detailed description taken in conjunction with the accompanying drawings, in which:

DETAILED DESCRIPTION

Figure 1:
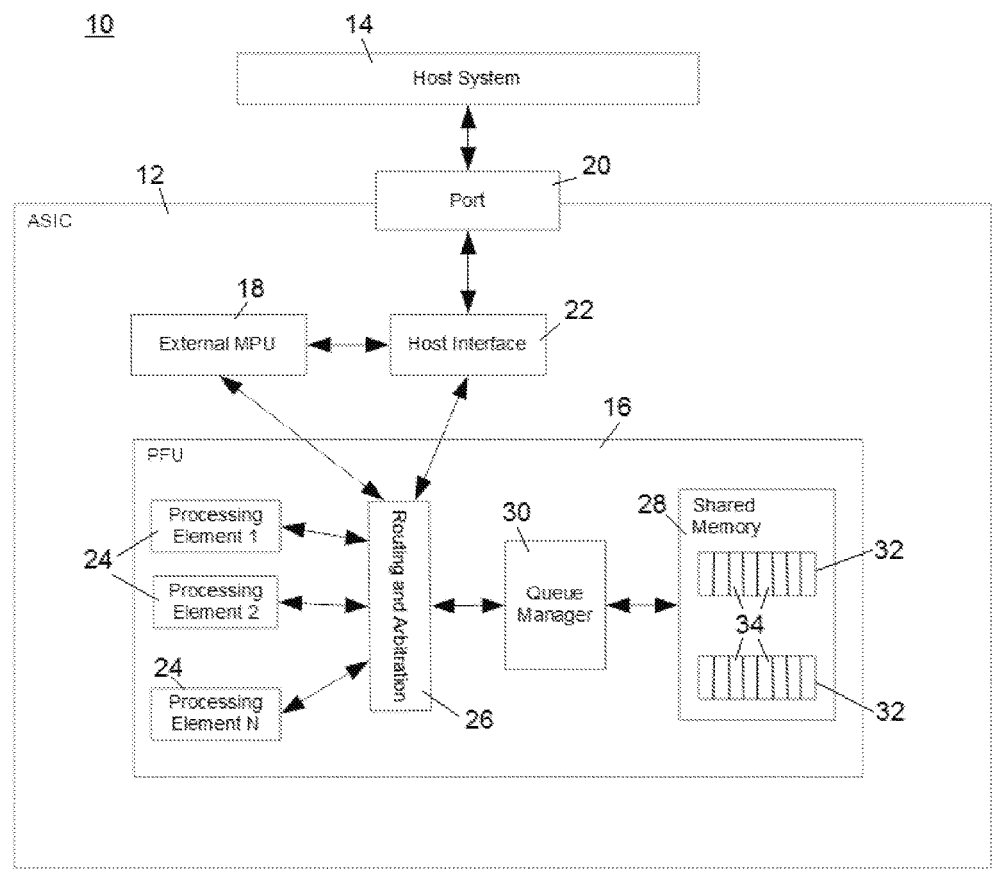
FIG. 1 depicts a multi-processor computing system according to one or more embodiments of the present invention.

There are provided methods, devices, systems and computer program products for managing multi-processor computing operations related to accessing a shared memory. An embodiment of a multi-processor system includes a hardware queue manager configured to intercept communications or instructions from one or more processors in the system and perform queueing operations. The queue manager is dynamically configurable, allowing for parameters such as queue element size, queue length and queuing behavior to be changed at any time. The queue manager relieves the processors of having to perform various queueing operations and ensures that multiple processors can safely operate on any queue simultaneously or otherwise, without requiring the processors to first inspect the queues to avoid conflicts or overruns.

The hardware queue manager handles queueing operations and consolidates aspects of the operations, including determining whether a queue full condition exists, inspecting queues, configuring queues, launching dequeues and launching enqueues. By performing these distinct operations, the queue manager is able to relieve the processing elements from having to perform these functions and can allow the processing elements to check for queue full conditions without having to directly inspect the queues. For example, a processing element can request enqueue or dequeue from a shared queue without having to first check with other processing elements to avoid conflicts or overruns.

In one embodiment, the queue manager is configured to generate and store a threshold value, also referred to as a watermark, for each queue in the shared memory. The watermark may be a queue full threshold value (also referred to as a high watermark) or a queue empty threshold value (also referred to as a low watermark).

The queue full threshold value indicates a maximum number of queue elements that can be written to for a respective queue before a queue full condition is detected. The threshold value may be based on a number of processors or processing elements that have access to the shared memory. The queue empty threshold value corresponds to a minimum number of queue elements that must be filled so that the queue is not considered empty. If the number of full queue elements (i.e., elements in which data is stored) is less than the minimum number, the queue is considered to be in a queue empty condition.

The threshold value is dynamically configurable, in that the threshold value can be set or changed at initialization and at any suitable time after initialization. For example, the queue full threshold value and/or the queue empty threshold value can be changed in response to changes in the number of processors or processing elements that have access to the shared memory. Embodiments of the high watermark or queue full threshold value ensure that a queue overrun does not occur due to simultaneous access to the queue by multiple processors. The low watermark or queue empty threshold can provide or facilitate various functions, such as coalescing or merging adjacent blocks of memory.

FIG. 1 depicts a multi-processor computing system 10 according to an embodiment of the present invention. The computing system 10 can be used to perform various actions, including receiving and processing user inputs and performing various processing actions as described herein, including storing and processing data, executing programs and displaying information. The computing system 10 may be used in a server computer, a desktop computer, a laptop computer, a tablet computer, a smartphone, or any other computing system.

The computing system 10 includes a hardware device 12 that is connected to a host processing system 14. Examples of the hardware device include storage cards and I/O cards such as network or modem cards. The hardware device 12 may be connected via any suitable communication link, such as a peripheral component interconnect (PCI) link or a peripheral component interconnect express (PCIe) link. The host processing system 14 may be any suitable computer processing system, including distributed computer processing systems and mainframe computer processing systems such as a z/Architecture system by IBM®.

The hardware device 12 includes a programmable function unit (PFU) 16 that may be connected to various devices and components on the hardware device and/or external devices. For example, the PFU 16 is communicatively connected to components of the hardware device 12 such as a multi-processor unit (MPU) 18 that includes multiple processors (e.g., processing cores). Each processor may be a central processing unit, an application-specific integrated circuit (ASIC), a digital signal processor, a field programmable gate array (FPGA), a digital circuit, an analog circuit, or combinations thereof. The hardware device 12 is not limited to the embodiment shown in FIG. 1, and may have different configurations and include various functional units or other components.

The PFU 16 may also be communicatively connected to devices or components external to the hardware device 12. For example, the PFU 16 can be connected to the host system 14 by interface and/or communication components such as a port 20 and an interface 22. The PFU 16 includes hardware logic and other components such as multiple processing elements 24, a routing and arbitration unit 26 and a shared memory 28.

The shared memory 28 can be accessed by the processing elements 24 via a hardware queue manager 30. The hardware queue manager 30 is a programmable or configurable hardware component that can be formed on the hardware device 12 (e.g., on an ASIC chip) or formed on another component or location of the hardware device 12. The queue manager 30 includes a control circuit or other suitable logic for processing instructions from each processing element 24 and performing operations relating to queues used to access the shared memory 28, such as enqueuing, dequeuing, snooping (or peeking) and queue management operations.

It is noted that the number, type and/or configuration of the processing elements and other components of the computing system are not limited to that described herein. For example, the processing elements may include processing elements at other locations, such as processing cores in the MPU (and/or processing elements therein), processors at other locations on the hardware device 12 and external processing devices (e.g., in the host system).

The queue manager 30 includes or is connected to one or more queues 32 stored in the shared memory 28. Each queue 32 may be any suitable type, such as first-in-first-out (FIFO)

or last-in-first-out (LIFO) queue, and can be configured for different purposes. For example, the queues 32 can include, e.g., one or more command queues, receive queues, send queues and/or logging queues. Each queue includes discrete queue elements 34, which can be dynamically configured, e.g., to change the size or length of a queue element 34. Each queue element 34 may be independently accessible as a discrete element. In one embodiment, the queues 32 are hardware queues located within the PFU 16 or disposed at another location (e.g., on the hardware device 12 and/or the MPU 18) and operably connected to the queue manager 30.

The queue manager 30 relieves processing elements from performing various queueing operations involved in processing data and communication. From the view of the processing elements in the system, access to the shared memory 28 is transparent. Thus, it appears to the processing elements that they can access the shared memory 28 directly and can request access to the queues 32 in the shared memory 28 without having to coordinate with other processing elements accessing the shared memory 28. Processing elements can thereby simultaneously request access without causing overruns, as the queue manager 30 handles actual queueing and coordinating reading to and writing from the queues 32.

Figure 2:
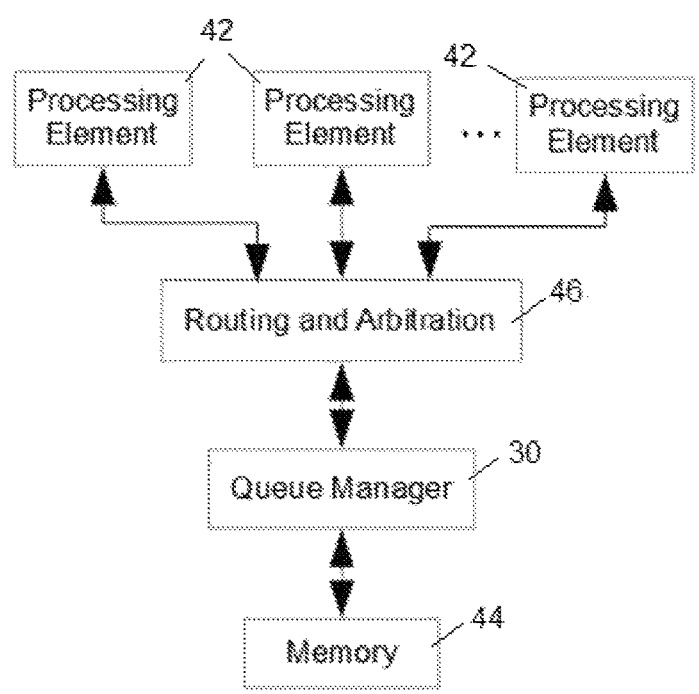
FIG. 2 is a block diagram that illustrates aspects of the functionality of a queue manager according to one or more embodiments of the present invention.

FIG. 2 is a block diagram that illustrates aspects of an embodiment of a multi-processor environment and the functionality of the queue manager 30. A plurality of individual processing elements 42 are communicatively connected to a memory 44 that is independently and simultaneously accessible by each processing element 42. The memory 44 may be the shared memory 28 or any other memory that is shared by multiple processing elements. As shown, each processing element 42 can individually and independently issue instructions (e.g., read and/or write instructions) to the memory 44 according to programmed routing and arbitration rules 46. Each message to the shared memory transmitted from a processing element 42 and is intercepted by the queue manager 30.

The queue manager 30 in this embodiment is a block of logic which is distinct from the memory 44 and is interposed between the processing elements and the shared memory. The queue manager 30 intercepts requests to a particular memory address and handles queuing operations without requiring processors to check individual queues or perform queueing operations, which reduces overhead and processing loads on the processors. For example, the queue manager 30 can perform functions such as determining specific queues or queue elements for reading or writing, updating queues, address translation and maintenance and logging of queues.

Any processing element (e.g., the processing element 24 and/or processing element 42) may request a read or write operation at any time without having to actively check memory locations or queues, as the hardware queue manager 30 performs various queueing operations involved in executing read and write operations. In one embodiment, the processing element can check a queue full indicator stored in the processing element (e.g., in a register) prior to requesting a write or store operation. In another embodiment, a processing element can check a queue empty indicator prior to requesting a read operation. A processing element can send a single write or store operation to write data into a queue or read data from a queue, as the queue manager handles all of the functions needed to execute the operation.

For example, the requesting processing element can request a read or write by specifying an address in memory of a queue, e.g., a read queue or a write queue, or an address associated with a specific type of queueing operation. For example, the queue manager 30 designates specific addresses in the shared memory (referred to as operation addresses), that can be specified by the processing element to request an operation. The queue manager 30 then performs functions to check the queue, determine which queue elements are available and the location of such elements, enqueue to or dequeue from a queue, update queue status, and perform logging functions. In this way, the processing element need only indicate an operation address associated with an operation (e.g., reading or writing), as the queue manager 30 reduces the processing load on the processing element and shields programmers from all of the overhead associated with queuing. In addition, the queue manager 30 allows for writing to or reading from a fixed address without having to update metadata.

The queue manager 30 may be dynamically configurable so that parameters of the queue manager's behavior and/or parameters of individual queues and queue elements can be adjusted or changed at any desired time after initial assembly or initial configuration. For example, the queue manager 30 can be configured to set the size of independent discrete queue elements in the queue (e.g., queue elements 34), allow for performing different types of queuing operations (e.g., enqueuing to the head of a queue instead of the tail, setting a queue full threshold, maintaining high watermarks or other indicators of the queue full threshold, maintaining low watermarks or other indicators of the queue empty threshold, peeking at an element at the tail of a queue without dequeuing from the queue, etc.), and/or provide the ability to dequeue or enqueue multiple elements at a time.

The queue manager 30 can store configuration parameters at any suitable location that is accessible to the queue manager 30. For example, the queue manager 30 may include hardware registers (e.g., configuration registers), indexed to each queue 32, that stores configuration parameters. Parameters that can be stored (and changed dynamically) include queue type (e.g., FIFO or LIFO), whether writing to a full queue is allowed, a queue full threshold (e.g., maximum number of queue entries), a queue empty threshold (e.g., minimum number of queue entries), queue width (size of individual queue elements), and queue depth (total number of queue elements).

The queue manager 30 may be configured to provide one or more indicators of the status of each queue 32. Each of the indicators can be stored, e.g., in respective hardware registers in the queue manager 30 and indexed to each queue 32, which allow the queue manager 30 to set a value of the indicator. An indicator may be returned to a requesting processing element to inform the processing element of queue status. For example, the queue manager 30 can maintain indicators or values for queue statuses such as queue full, queue empty and current queue element count. Indicators may be transmitted to processing elements in response to processing element requests or broadcast to one or more processing elements if the status of a queue or queues changes.

In one embodiment, the queue manager 30 is configured to generate and maintain a threshold value or watermark for each queue 32. A "watermark" as described herein is a digital value or indicator representing a threshold value or other indication of a number of processing elements. The threshold value may be a queue full threshold value indicating a maximum number of queue elements that can be written to before a queue full condition is recognized. The queue full threshold may be based on a maximum number of processing elements that can access a queue at any given time.

The watermark is dynamically configurable and can be checked by the queue manager 30 and/or checked by individual processing elements. For example, each processing element can be configured to be able to independently check a queue full threshold or high watermark for a requested queue prior to sending a write request or message to the shared memory. The high watermark prevents queue overruns by ensuring that there are enough empty queue elements 34 to accommodate simultaneous requests by each of the processing elements without causing an overrun.

The high watermark eliminates the risk of queue overruns in a multiprocessing environment due to multiple processing elements accessing the same queue. In conventional multiprocessing environments, where checking for a queue full condition and launching an enqueue are distinct operations, it is possible to encounter queue overruns. The high watermark reduces or eliminates such a possibility without requiring processing elements to perform additional operations, such as checking a queue and communicating with other processing elements to coordinate access to the queue.

The high watermark is programmable to establish when a queue full condition has been reached. The high watermark allows multiple masters or processing elements to simultaneously request access to a queue, or otherwise request access in parallel, without each processing element having to inspect the queue itself or otherwise perform further operations beyond the request. Likewise, the low watermark is programmable to establish when a queue empty condition has been reached. The queue manager 30 can both maintain the watermark (high and/or low watermark), adjust the watermark as needed, and inspect the watermark in response to a request and determine whether a queue full condition exists.

The hardware queue manager 30 can establish a threshold number of queue entries for each queue in a shared memory, such as each of the queues 32 of FIG. 1. The high watermark indicates a number of entries at which the queue manager logic will set a queue full indicator or at which a requesting processing element will recognize a queue full condition. The queue full indicator can be sent to a requesting processor from the queue manager 30 via any type of message or communication, to inform the processing element that a queue is full. In addition to, or alternatively, the queue manager 30 can perform one or more other actions, such as re-routing the request to another queue.

In one embodiment, a queue (e.g., a hardware queue such as a queue 32, or a software queue implemented in software) is watermarked with a threshold value that is based on factors such as the queue size (the total number of queue elements in the queue) and/or the number of processing elements that have access to the queue or may have access in the future. The queue has a number of queue elements, each having a size (some number of bytes) configured based on the size of messages transmitted by the processors. The queue element size can be selected, e.g., based on the communication protocol used by the processing elements. The full watermark threshold can be selected so that all of the processing elements can simultaneously access the queue without the possibility of an overrun. For example, the threshold set for the high watermark can be equal to the maximum size of the queue (i.e., the total number of queue elements) minus the number of processing elements. This allows multiple processing elements to enqueue simultaneously without any need for interlocking or synchronization.

Figure 3:
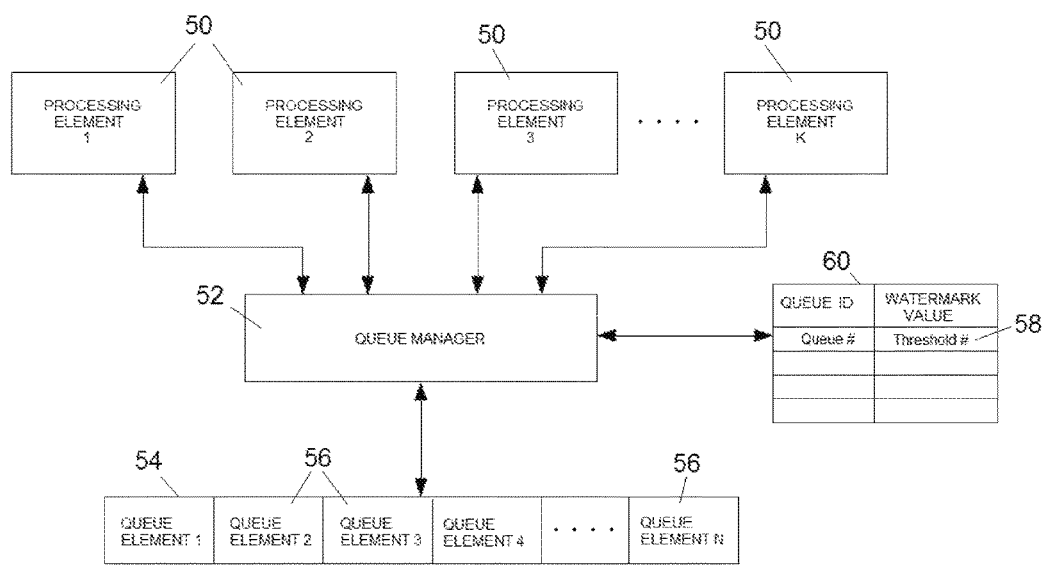
FIG. 3 is a block diagram that illustrates aspects of a queue manager and watermark functionality for generating and maintaining dynamically configurable queue full thresholds.

An example of a high watermark and aspects of queue manager functions is discussed with reference to FIG. 3. FIG. 3 shows a plurality of processing elements 50 and a hardware queue manager 52 configured to intercept messages sent to a shared memory. One or more queues 54 are located in the shared memory and are configurable by the queue manager 52. Each queue 54 includes a plurality of configurable queue elements 56. In this example, there are K processing elements 50, and the queue 54 includes N queue elements 56. The K processors are capable of producing entries in parallel to the queue 54. Although only one queue is shown, it is understood that the shared memory can include any number of queues 54.

The queue manager 52 is configured to set a watermark 58 that indicates a queue full threshold value, which in this example is a maximum number of queue elements 56 that can be filled before a queue full condition is detected. The watermark 58 may be stored at any suitable location, such as within the queue itself (e.g., at the head of the queue), in the shared memory, or at any other suitable location. In this example, the watermark for each queue 54 can be stored in table 60 or other suitable data structure in, e.g., a hardware register maintained by the queue manager 52.

In this example, the queue full threshold value is set to K−1, meaning that a queue full condition is indicated whenever there are K−1 or fewer free queue elements or slots in the queue. Alternatively, the queue full threshold can be set in terms of the number of full slots in the queue. For example, the queue full threshold can be set at N−K, meaning that the queue full condition will be indicated when there are N−K or more used slots or queue elements 56.

The watermark 58 guarantees that there are at least K free slots in the queue 54 when the queue 54 is not in a queue full condition. In this example, if there are exactly K free slots, each of the K processors would observe that the queue was not full and could launch an enqueue operation (which may also be referred to as a write or store operation). When one of the processing elements 50 requests an enqueue operation, no queue full condition is detected, and the enqueue is executed. After this point, there are K−1 free slots, which is equal to the threshold. Subsequent requests for enqueue will be rejected by the queue manager, or alternatively, a processing element 50 detects the queue full indicator and does not execute the request. Hence, in this scenario, there could never be more than a total of K enqueues at a time, which matches the number of available queue elements, and therefore each of the K enqueue operations will succeed.

Although the embodiment of FIG. 3 is described in conjunction with high watermarks or queue full thresholds, they are not so limited. The queue manager 52 can be configured to set a low watermark for a queue 54, in addition to or in place of a high watermark. For example, the watermark 58 can be a low watermark, or a low watermark may be stored (e.g., in the table 60) in addition to a high watermark for each queue 54.

A low watermark can be useful in a number of circumstances. For example, a low water mark can facilitate coalescing. Sometimes there is work that does not need to be handled immediately, and it is more efficient to handle multiple pieces of it together. The low watermark can allow a processing element to put data onto a queue and prevent additional writes until the processing element is ready to dequeue or write more data.

The low watermark can be set for a single consumer (e.g., processing element) or for multiple consumers. For a single consumer, the single consumer knows the watermark value and can dequeue all of the queue elements, whereas other consumers may receive a queue empty indicator in response to sending a dequeue request to the queue. If there are multiple consumers of the queue, then they could all dequeue almost simultaneously, effectively creating a gang scheduling situation. Thus, the low watermark can be configurable so that one or more selected consumers can be made aware of the actual contents of a queue (regardless of the number of full queue elements), while one or more other consumers receive or inspect a queue empty indicator without being aware that there are full queue elements in the queue.

The queue manager configuration is dynamic as the configuration is not permanently written into the queue manager but can be changed as desired after initial configuration. The configuration may be changed by a user via any suitable mechanism, such as a software interface to the queue manager. Parameters that can be dynamically configured or changed include the number, type and format of indicators, such as the high watermark or queue full indicator, the low watermark or queue empty indicator, and/or other indicators (e.g., queue depth indicators). Parameters of the high and/or low watermark that can be dynamically configured include the format of the watermark and the value of the corresponding threshold.

For example, a user can reconfigure parameters of one or more queues such as queue length and queue element size, e.g., to accommodate new communication protocols. Some examples of configurable parameters include queue type (e.g., LIFO or FIFO), the number of queue elements in a queue, the size of each queue element in a queue, and the base address of queue element storage (e.g., the starting address of each queue).

Other parameters that can be dynamically set or changed include the behavior of the queue manager 30 when attempting to enqueue to a full queue or dequeue from an empty queue or queue element. For example, the queue manager 30 can be configured to allow an error to be raised or data to be overwritten when enqueuing to a full queue. The queue manager 30 can also be configured to return an empty sentinel or other indication that is returned when a dequeue is executed against an empty queue. If a queue empty threshold is set, and the number of full queue elements is less than the queue empty threshold number, the queue manager 30 can return an empty signal. The queue manager 30 can prevent dequeue from the queue, or allow the processing element to dequeue, depending on the queue manager configuration.

The queue manager can store configuration parameters at any suitable location that is accessible to the queue manager. For example, the queue manager may include hardware registers (e.g., configuration registers), indexed to each queue, which store configuration parameters. Parameters that can be stored (and changed dynamically) include queue type (e.g., FIFO or LIFO), whether writing to a full queue is allowed, a queue full threshold (e.g., maximum number of queue entries, this is where the watermark is configured for a queue), a queue empty threshold, queue width (size of individual queue elements), and queue depth (total number of queue elements).

Figure 4:
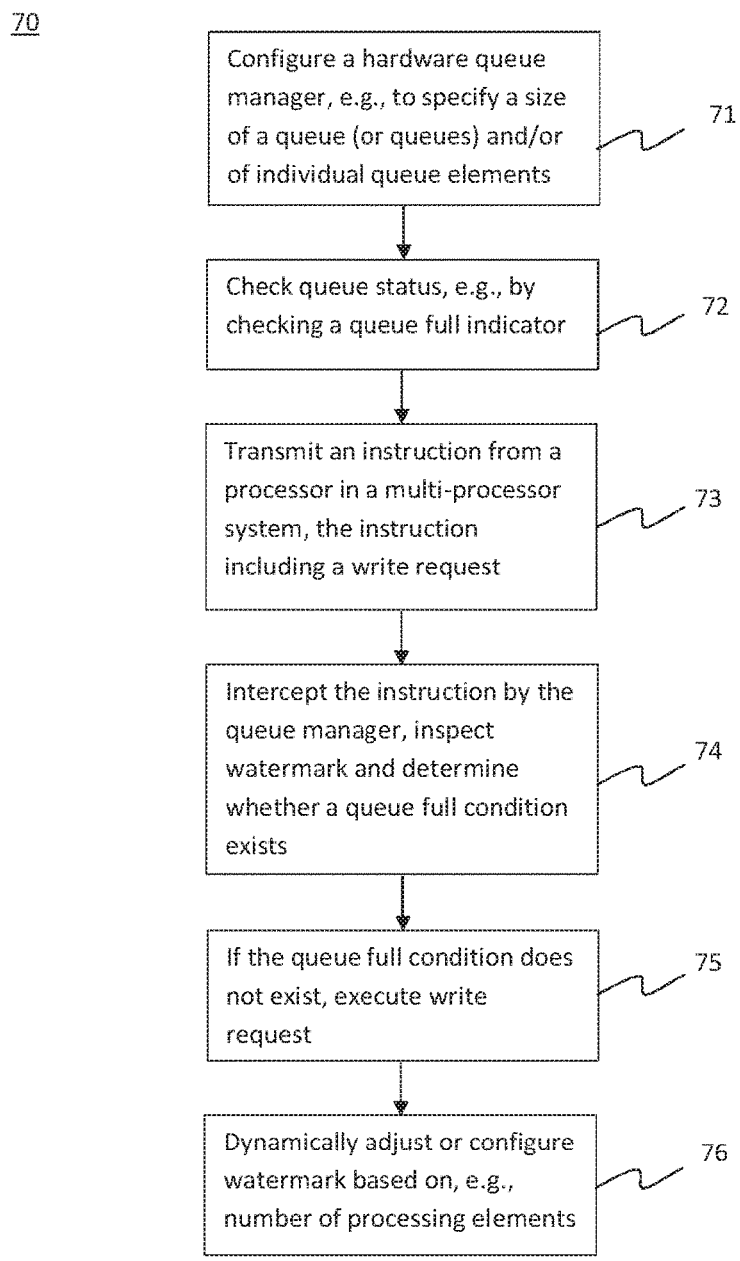
FIG. 4 is a flow diagram depicting an embodiment of a method of performing a computing operation that includes accessing a shared memory by one or more processors in a multi-processor environment.

FIG. 4 is a flow diagram depicting an embodiment of a method 70 of performing a computing operation that includes accessing a shared memory by one or more processors in a multi-processor environment. The method 70 includes a number of steps or stages represented by blocks 71-76. One or more embodiments include the execution of all of the steps shown in blocks 71-76 in the order described. However, certain steps may be omitted, steps may be added, or the order of the steps changed.

The method 70 is discussed in conjunction with the example of FIG. 3 for illustration purposes. It is to be understood that the method 70 is not limited to being performed in conjunction with the example of FIG. 3, but could be performed in conjunction with any suitable multi-processor system or environment.

In the first stage 71, a hardware queue manager such as the queue manager 52 of FIG. 1 is initially configured according to an initial configuration. The configuration specifies parameters of the queue manager, such as a number of queues, types of queues, queue length and size of queue elements. Other parameters include, for example, whether the queue manager 52 will raise an error or overwrite queue element(s) if there is a queue full condition. The configuration of the queue(s) and/or queue manager may be changed after the initial configuration as required, e.g., to accommodate different packet or message sizes.

The queue manager 52 can also be initially configured to set one or more initial watermarks for each queue. The one or more initial watermarks may include a high watermark that indicates a threshold value (a queue full threshold) at which each queue is considered to be full. The one or more initial watermarks may also include a low watermark that indicates a threshold value corresponding to a number of queue elements (a queue empty threshold), where if a number of full queue elements is less than the threshold, a queue empty condition is recognized.

For example, the queue manager 52 stores a high watermark 58 for each queue 54 as a table 60 or other data structure. As discussed above, the high watermark 58 can be adjusted to change the queue full threshold value at any time after initialization to respond to changing conditions and configurations (e.g., changes in the number of processing elements having access to the queue, changes in communication or data protocols, different packet or message sizes, changes in the size of queue elements, etc.)

Each queue 54 is watermarked with a queue full threshold that is set so that writes (enqueues) can always be guaranteed to succeed. The queue full threshold may be a number corresponding to a maximum number of entries that can be written to the queue 54, which is set based on the number of processing elements 50.

In one embodiment, the queue full threshold is set to be equal to the total number of queue elements 56, or the maximum number of queue elements 56 that can be written to, minus the number of processing elements 50. This guarantees that there are a sufficient number of available queue elements 56 to accommodate all of the processing elements 50 simultaneously writing to the queue 54. For example, if the queue 54 is sixteen deep, i.e., has sixteen elements that can be written to, and the number of processing elements is four, the queue full threshold can be set to twelve. If more than twelve queue elements 56 have been written to, the queue 54 is considered to be in a full condition. In this way, the queue 54 is guaranteed to have sufficient space to allow a simultaneous enqueue by all four processing elements 50.

After initialization, the queue manager 52 monitors each queue 54 in the shared memory. For example, the queue manager 52 inspects a register or table (e.g., the table 60) that stores a watermark having a queue full threshold value for each queue 54. If the number of queue elements 56 in the queue 54 that have been written to meets or exceeds the threshold value, the queue manager 52 sets a queue full indicator, which can be stored in the queue manager 52 or transmitted to each processing element 50. Each processing element 50 can store the queue full indicator for the queue 54.

In the second stage 72, prior to transmitting a request to a queue in shared memory, a processing element such as one of the processing elements 50 performs a check to determine the status of the queue. For example, a processing element 50 checks the queue 54 to determine whether the queue is full by checking indicators stored in the processing element (e.g., in one or more hardware registers).

If the processing element 50 receives an instruction that includes or requires an enqueue to the queue 54, the processing element 50 can check whether a queue full indicator stored in the processing element (e.g., a queue full status register in the processing element) for the queue 54 has been set. If the queue full indicator is set (indicating that there is a queue full condition), the processing element 50 does not execute the instruction or waits until the queue manager 52 indicates that the queue 54 is no longer full. Alternatively, if overwriting the queue 54 is allowed (e.g., as indicated in the configuration register in the queue manager), the processing element 50 can overwrite one or more elements 56 in the queue 54 via the queue manager 52.

Likewise, if the instruction includes or requires a dequeue of a queue, the processing element 50 can check whether a queue valid or not-empty indicator (e.g., a queue valid status register in the processing element) has been set. If the queue valid indicator has been set (indicating that the queue is not empty), the processing element 50 can proceed with the dequeue. Otherwise, the processing element 50 does not transmit the dequeue request or waits until the queue is no longer empty. The queue valid indicator may be stored in registers in each processing element. It is noted that once the processing element 50 checks the queue status via an indicator stored in the processing element and requests an enqueue or dequeue, the processing element 50 does not need to perform any further queuing operations; the actual enqueuing or dequeuing is executed by the queue manager 52.

In one embodiment, if a low water mark is set for a queue, the processing element 50 can request a dequeue, and if the number of full elements is less than the queue empty threshold number, the queue manager 52 can reject the request and/or return a queue empty signal. Depending on the queue manager configuration, the queue manager 52 can allow or prevent dequeues from the queue.

In one embodiment, a processing element can receive a "wait event" instruction, which directs the processing element to wait until a selected condition is met. For example, a processing element 50 can be instructed to wait until the queue 54 is valid (i.e., not empty) before dequeuing, or wait until the queue 54 has sufficient free space (i.e., is not full) before enqueuing. The wait event instruction may be executed by the processing element in conjunction with the indicators discussed above.

In the third stage 73, the processing element transmits a message including a request and/or data to a shared memory to perform an operation. For example, the processing element 50 transmits a message that includes a read request for data stored in the shared memory, or that includes a write or store request and associated data for storing the data in the shared memory. The message may include a request to write or store data to a specific queue.

In the fourth stage 74, the queue manager intercepts the message and processes the instruction(s) therein. For example, the queue manager 52 intercepts a request from a processing element 50 for access to the queue 54. As part of the processing, the queue manager 52 determines the queue that is requested. If the operation is a write operation, the queue manager 52 determines whether a high watermark is present. If the high watermark is present, the queue manager inspects the watermark to determine the queue full threshold value, and compares the number of used elements to the threshold.

If the queue full condition exists, e.g., the number of existing entries is equal to (or greater than) the queue full threshold value of the watermark 58, the queue manager 52 does not execute the write. The queue manager 52 then performs one or more appropriate actions, such as returning a message to the processing element and indicating that the write has not been executed.

In the fifth stage 75, if the queue full condition does not exist, and the request is for a write operation, the queue manager executes the write operation. The queue manager can write data from the processing element into one or more queue elements.

If the operation is a read operation, the queue manager 52 determines whether a low watermark is present. If the low watermark is present, the queue manager inspects the watermark to determine the queue empty threshold value, and compares the number of used elements to the threshold. If a queue empty condition does not exist, e.g., the number of existing entries is greater than or equal to the queue empty value of the low watermark, the queue manager 52 executes the read. If a queue empty condition exists, e.g., the number of existing entries is less than the queue empty value of the low watermark, the queue manager 52 returns an empty sentinel or other indicator, and may or may not execute the read.

In the sixth stage 76, if conditions change that could affect the maximum number of queue entries, the queue manager adjusts the watermark to change the threshold. For example, if the number of processing elements 50 that have access to the queue 54 increases or decreases, the watermark 58 may be adjusted to reflect the new number of processing elements 50. In another example, if other configurations of the queue manager 52 are changed, such as a change in the size or number of queue elements 56, the watermark 58 may be adjusted accordingly.

In one embodiment, the queue manager maintains the status of each queue and transmits an indicator or other communication to indicate the status of a queue when the status changes. For example, if a queue becomes full, the queue manager can send a queue full indicator to each processing element. If a queue becomes empty, the queue manager can send a queue empty indicator (e.g., send a signal to cause a queue valid indicator in the processing element to be set to zero), or if a queue is written to, causing the queue to go from an empty to a not-empty condition, the queue manager can send an appropriate indicator (e.g., send a signal to cause the queue valid indicator to be set to one).

In one example, if the status of a queue changes, the queue manager can send a signal to cause appropriate indicators maintained in processing element registers to be set. For example, the queue manager can set or change status indicators such as queue full indicators and queue valid indicators in processing element registers. This allows each processing element to quickly check the status of a queue (e.g., in one clock cycle) before executing an instruction or sending a request to the shared memory.

It is noted that aspects of the method 70 may be performed based on messages or instructions transmitted in parallel from multiple processors. Each processor can transmit an instruction without having to coordinate with other processors and without having to check whether any given queue or queue element is open but instead can simply transmit the instruction with a base address and/or an operation address.

Technical effects and benefits include the ability to facilitate communications and transfers between processors and a shared memory in a multi-processor environment. Embodiments of a hardware queue manager and watermark described herein increase the performance of multi-processor computing systems and components by relieving individual processors of the need to directly inspect queues, coordinate access to a shared memory with other processors, and perform queueing operations. The embodiments also allow multiple processors to simultaneously transmit data and instructions to a single queue without having to coordinate or synchronize access to the queue, and/or without having to be concerned with conflicts and overruns.

The following example illustrates improvements in a multi-processor system provided by embodiments described herein. In a conventional multi-processor environment, a typical program sequence would be as follows. To perform an enqueue to a queue, a processing element checks the queue and waits if the queue is full. After a first processing interval, the processing element then launches the enqueue operation. Subsequently, after a second processing interval, the processing element checks for completion of the enqueue operation.

If there is only a single processing element producing data elements and placing them on a queue, as long as the processing element checks whether the queue is full prior to enqueuing an element, there is no possibility of overrunning the queue. However, if there are multiple processors, there can be a number of processing elements competing to enqueue a value to a shared queue, where each processing element checks the full status of the queue at some point prior to executing each enqueue operation. Because there is a gap between checking for the queue full condition and performing the enqueue operation (the first processing interval), there is a possibility of overrunning the queue. For example, if there is only one free queue element, multiple processors could potentially observe a free entry prior to writing to the queue, which would result in multiple enqueue operations failing. To prevent overruns from occurring in a conventional system, one would have to synchronize access to the queue. The embodiments described herein address this problem by setting a dynamically configurable watermark or queue full threshold that guarantees that there are sufficient free queue elements to accommodate all of the processing elements at any given time, without requiring the processing elements to synchronize access.

For example, some hardware devices include a programmable function unit or other component that include multiple processing elements, which communicate via hardware queues (e.g., the queues 32). Embodiments prevent overruns due to multiple processing elements attempting to transmit a message to a single receiving processing element via the receiving processing element's queue. In another example, the embodiments prevent overruns and improve performance in multi-processor environments where the bus connected to the processing elements only allow blind writes.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method of managing one or more queues in a multi-processor environment, the method comprising:
    monitoring, by a queue manager, a queue in a memory configured to be accessed by a plurality of processing elements in the multi-processor environment, the queue manager disposed in communication with a plurality of processors and with the memory, the queue manager configured to control a queue in the memory, the queue including a plurality of queue elements, the queue manager configured to intercept a message from a processing element of the plurality of processing elements and perform one or more queuing operations on the queue based on the message;
    inspecting a dynamically configurable queue full value maintained by the queue manager, the queue full value being a threshold value that specifies a maximum number of the queue elements that can be written to before a queue full condition is detected, wherein the maximum number of queue elements is based on a total number of processing elements that have access to the memory at a given time;
    comparing a number of full queue elements in the queue to the threshold value; and
    detecting the queue full condition based on the number of full queue elements equal to or exceeding the threshold value.

2. The method of claim 1, wherein the queue manager is a hardware component disposed at a communication path between the plurality of processors and the memory.

3. The method of claim 1, wherein the maximum number of queue elements is equal to a difference between the total number of processing elements and a total number of queue elements in the queue.

4. The method of claim 1, further comprising preventing one or more enqueues from the plurality of processing elements by the queue manager based on detecting the queue full condition.

5. The method of claim 1, further comprising inspecting a dynamically configurable queue empty value maintained by the queue manager, the queue empty value corresponding to a minimum number of queue elements, wherein a queue empty condition is detected based on a number of full queue elements being less than the minimum number.

6. The method of claim 5, wherein each of the plurality of processors is configured to check for the queue full indicator prior to transmitting the message to the memory.

* * * * *